(No Model.)
S. J. ADAMS.
MOLDING APPARATUS.
No. 522,000. Patented June 26, 1894.
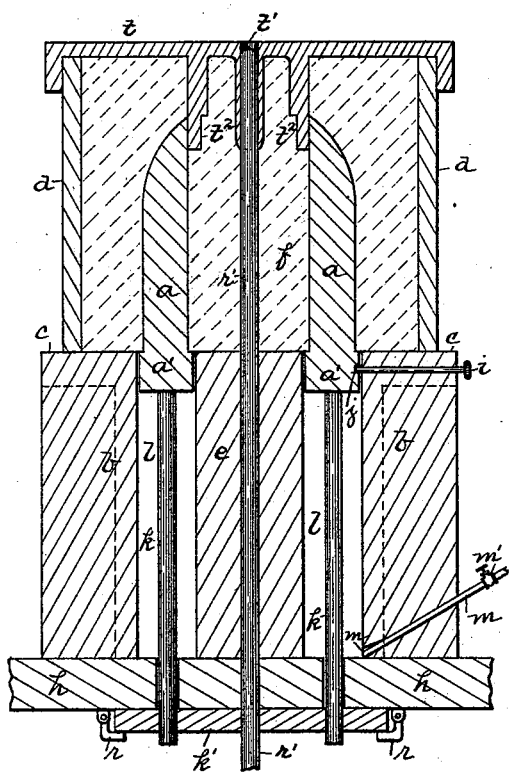
Fig. 1.
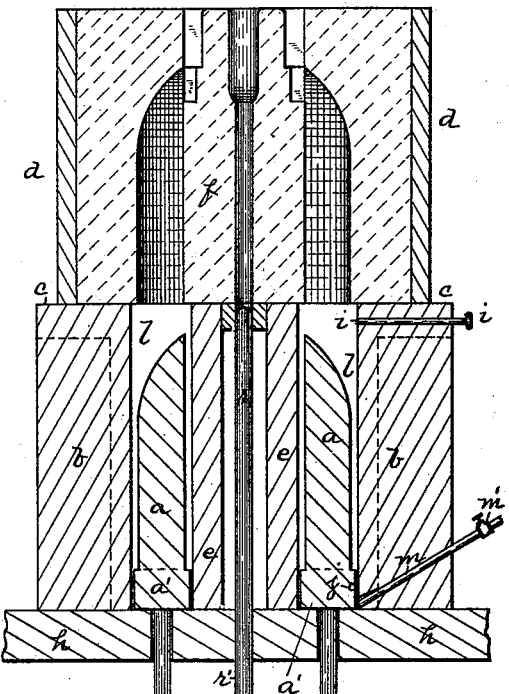
Fig. 2.
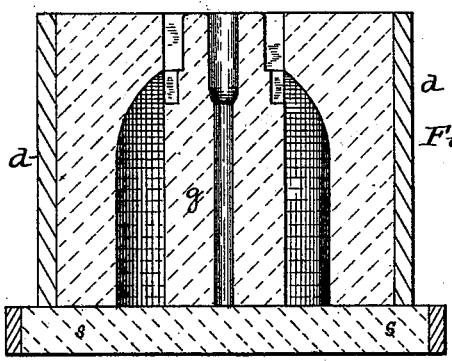
Fig. 3.
Witnesses:
J. N. Cooke.
F. G. Kay.
Inventor:
Stephen Jarvis Adams
By James F. Kay
Attorney
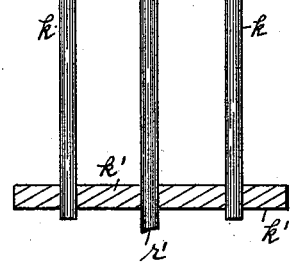
THE NATIONAL LITHOGRAPHING COMPANY,
WASHINGTON, D. C.

UNITED STATES PATENT OFFICE.

STEPHEN JARVIS ADAMS, OF PITTSBURG, PENNSYLVANIA.

MOLDING APPARATUS.

SPECIFICATION forming part of Letters Patent No. 522,000, dated June 26, 1894.

Application filed July 23, 1891. Serial No. 400,458. (No model.)

*To all whom it may concern:*

Be it known that I, STEPHEN JARVIS ADAMS, a resident of Pittsburg, in the county of Allegheny and State of Pennsylvania, have invented a new and useful Improvement in Molding Apparatus; and I do hereby declare the following to be a full, clear, and exact description thereof.

My invention relates to molding apparatus; its object being to provide a means for causing the gradual withdrawal of patterns from the sand molds formed thereby, such as the withdrawal of patterns for wagon boxes and like tubular articles formed in one part flasks. These patterns are sometimes made exceedingly large and heavy for large pipe balls, and in their approved form are simply large cylinders of the proper length, the ball being supported on suitable mandrels within the rolls; and, as they are simply composed of such rings or sleeves, the patterns for them correspond thereto, and it is desirable to provide some means for controlling the dropping of the patterns from the finished mold, so that all injury to either the mold formed or to the pattern itself will be prevented.

One of the objects of the present invention is to utilize a body of compressed air as a cushion for controlling the movement of the pattern in its descent, and at the same time to insure the cushioning of the pattern and prevent its striking with a heavy blow against the support provided therefor, when it is withdrawn.

To these ends my invention consists, generally stated, in combining with the pattern a table supporting the flask and having a vertical cylinder extending down therefrom, in which the pattern support is mounted, the said cylinder having a small air escape opening by means of which fluid in the cylinder is permitted to escape and the descent of the pattern is controlled, and it is cushioned as it reaches the support on which it is to rest.

It also consists in certain other improvements, all of which will be more particularly hereinafter described and claimed.

To enable others skilled in the art to make and use my invention, I will describe the same more fully, referring to the accompanying drawings, in which—

Figure 1 is a longitudinal section of a mold and the molding apparatus, showing the completed mold, and the pattern ready to be withdrawn therefrom. Fig. 2 is a like view showing the pattern withdrawn from the mold; and Fig. 3 is a like view of one form of finished mold which can be made by the apparatus.

The pattern $a$ which can be of any desired form, and which in the drawings is illustrated as a tubular pattern for making pipe balls in the form of sleeve or sleeves is mounted on the cylinder $b$, which cylinder corresponds nearly in diameter to the base of the pattern, while the upper edge of the cylinder forms a molding table $c$ on which the flask $d$ rests, the cylinder thus extending down from the table. In the center of the cylinder $b$ is formed the cylindrical block $e$ which fits neatly within the base of the pattern $a$ so as to close the tubular passage $f$ through the pattern, and form a support for the core $g$ which is formed with the mold as hereinafter described. This cylindrical block $b$ can either be solid, as shown in Fig. 1, or cored out, as shown in Fig. 2. Where, however, such post is employed, it will be evident that the space between said post and the cylinder $b$ forms an annular chamber, which is closed at the base by the base plate $h$ into which the upper end of the pattern $a$ fits, it being desirable that the pattern shall fit the same neatly so as to prevent the escape of air at the upper end thereof.

I have illustrated the pattern as having an annular enlargement $a'$ at the base of the pattern body $a$ to act as a guide within the cylinder $b$ and to prevent the scoring of the pattern in its descent by the metal of the cylinder, or from other like cause, such enlargement $a'$ being a simple annular fillet either around the outside, or in the case shown both around the inside and the outside, of the pattern, extending out a very slight distance, just sufficient to enable the pattern body to escape the metal guide way through which it passes. Such device may also well be employed with the ordinary stripping plate to prevent the scoring of the pattern body thereby. In some cases the base $a'$ of the pattern may be made separate therefrom, being simply a block or ring mounted within the cylinder, on which the pattern $a$ rests, and by which it is supported, either during the molding operation, or, if the mold be made on another table, simply during the withdrawal of the pattern, which rests thereon when the supporting block is lowered within the cylinder.

Any suitable means may be employed to support the pattern block $a'$ in its raised position, one device illustrated being a horizontally moving key $i$, which extends through the table $c$ at the top thereof and engages with a notch $j$ in the enlargement or block $a'$ of the pattern and so holds the pattern in its raised position. The other device illustrated is a supporting frame formed of the vertically movable bars $k$ $k$, secured at the base of the pattern support $a'$, and passing through the pattern plate $h$ of the cylinder and connected to a cross bar $k'$, so forming a supporting frame which may be supported by any suitable catch or like device to hold the pattern in its raised position and permit it to drop when desired. The openings for the escape of the air from the chamber $l$ of the cylinder may either be made around the standards $k$, which are then mounted loosely in the plate $h$, or said standards may fit the plate $h$ neatly and a separate valve controlled escape passage $m$ may be employed, said passage being formed of a tube having an escape valve $m'$ therein, which can regulate the escape of the fluid and provide for the cushioning of the pattern in its descent. Where heavy patterns are employed, it will generally be found that as soon as released, they will descend of their own weight, but in case of the binding or adherence of the sand to the same with such force as to prevent this, the pattern may be started either by the frame $k$, or by other suitable means.

In forming molds with the apparatus above described, the sand is packed around the pattern or around and within the pattern by any suitable means, the pattern being either held up by the bar $i$, the frame $k$, or other suitable apparatus. Where the pattern support $a'$ is made separate from the pattern, the mold may be formed on another table, and then passed onto the lowering table the pattern resting on the pattern support. When it is desired to cause the descent of the pattern where the bar $i$ is employed, it is withdrawn, so leaving the pattern free to descend. At the same time where the escape pipe $m$ is employed, its valve $m'$ is regulated properly to control the dropping of the pattern, and if the pattern will not drop of its own weight, an initial movement is imparted thereto. The pattern will then descend and as the rapid escape of the air from the chamber $l$ is prevented, it will descend against the pressure of the air within the chamber, the pattern by its weight acting to compress the air and the rapid descent of the pattern being checked thereby, until as it approaches the base of the chamber, its movement will be entirely checked or cushioned by the compression of the air. But as the air continues to escape through the escape opening $m$ or around the standards of the supporting frame, the pattern will settle down to the base of the chamber without jar, either to the pattern, the cylinder and its table, or to the mold supported by the table. As the pattern or its support descends, it will be guided in its movement by the cylinder, or in the case of an annular pattern, by the cylinder and the cylindrical block or post $e$. Where the supporting frame $k$ is employed, the initial movement may be imparted to the pattern by such frame, the hooks $r$ or other supporting device for the frame being withdrawn, and a slight movement imparted to the frame which will overcome the adherence of the sand to the pattern. By such apparatus, I am thus enabled to prevent injury to the pattern or the mold formed thereby, by any sudden jar imparted to the supporting table or mold and to cause the cushioning of the pattern in its descent from the mold. When the mold is completed it may be placed upon any suitable drag, such as at $s$, where the central core is formed with the mold, or if the mold is so constructed as to receive a separate core, the core may be placed therein and the mold prepared for casting.

For certain sizes of pipe welding balls it is considered desirable that the ball shall have lugs at the forward end to sustain the pressure on the ball, enlargements on the mandrel supporting the ball being thus rendered unnecessary. The present apparatus is suitable for forming such a ball; and when employed for the purpose, I connect a vertical guiding bar $r'$ to the frame $k$, which extends centrally through the cylindrical block $e$ and up above the flask when the pattern is in its raised position. Around this vertical bar the sand is compacted, and over the same the skeleton frame $t$ is placed, said frame having a central opening $t'$ through which the upper end of the bar $r'$ passes, so bringing the frame into proper relative position with the pattern $a$. The frame $t$ has two or more short vertical fingers or bars $t^2$ which are in line with the inner edge of the pattern, and when said frame is pushed downwardly these fingers pass into contact with the inner face of the pattern entering a short distance within the same, and so forming the molds for lugs at the end of the pipe ball against which the mandrel may strike. The passages from the top of the mold may form pouring gates or risers for the metal. If desired the bases of the bars forming these lugs, molds or cavities may be spread by suitable means and increase the size of the lug cavities, or the portions of the bars above the lugs may be made of greater width and thickness than the portions forming the lugs, and so provide for breaking off the risers, as described in an application filed by me March 11, 1891, Serial No. 384,554.

What I claim as my invention, and desire to secure by Letters Patent, is—

1. In sand molding apparatus, the combination of a table supporting the flask and having a vertical cylinder extending down therefrom, and a pattern support sliding in the same, said cylinder having a small escape opening, thereby providing for the compression of the air and preventing the rapid dropping of the pattern, substantially as and for the purposes set forth.

2. In sand molding apparatus, the combination of a table supporting the flask and having a vertical cylinder a pattern support sliding in the cylinder, said cylinder having a small escape opening and a frame extending up through the cylinder and connected to the pattern support, substantially as and for the purposes set forth.

3. In sand molding apparatus, the combination of a tubular pattern, a table supporting the flask and having a vertical cylinder extending down therefrom, and a post extending up within the cylinder, and so forming an annular chamber within which such tubular pattern fits, said chamber having a small air escape opening leading therefrom, substantially as and for the purposes set forth.

4. In sand molding apparatus, the combination of a tubular pattern, a frame connected to the lower end of and extending down from the pattern, a bar extending centrally from said frame up through the central passage of the pattern and to the top of the flask, and a frame carrying a pattern to be pressed down into contact with the main pattern, said frame fitting over said bar and being guided thereby in its movement, substantially as and for the purposes set forth.

In testimony whereof I, the said STEPHEN JARVIS ADAMS, have hereunto set my hand.

STEPHEN JARVIS ADAMS.

Witnesses:
JAMES I. KAY,
J. N. COOKE.